(12) United States Patent
Lewandowski et al.

(10) Patent No.: US 8,998,172 B2
(45) Date of Patent: Apr. 7, 2015

(54) BALL VALVE SEAT SEAL

(75) Inventors: Mark Lewandowski, Tomball, TX (US);
Glenn McClatchey, Houston, TX (US);
Phillip Treichel, Tomball, TX (US)

(73) Assignee: SPX Corporation, Charlotte, NC (US)

( * ) Notice: Subject to any disclaimer, the term of this patent is extended or adjusted under 35 U.S.C. 154(b) by 347 days.

(21) Appl. No.: 13/102,359

(22) Filed: May 6, 2011

(65) Prior Publication Data

US 2012/0112110 A1    May 10, 2012

Related U.S. Application Data

(60) Provisional application No. 61/332,515, filed on May 7, 2010.

(51) Int. Cl.
*F16K 5/00* (2006.01)
*F16K 25/00* (2006.01)
*F16K 25/02* (2006.01)
*F16K 5/06* (2006.01)

(52) U.S. Cl.
CPC .................... *F16K 5/0673* (2013.01)

(58) Field of Classification Search
USPC ............... 251/175, 176, 188, 314, 316, 317, 251/315.08, 368
See application file for complete search history.

(56) References Cited

U.S. PATENT DOCUMENTS

| | | | | |
|---|---|---|---|---|
| 2,861,773 | A | * | 11/1958 | Clade ........................ 251/315.13 |
| 3,408,038 | A | * | 10/1968 | Scaramucci .................. 251/175 |
| 3,462,120 | A | | 8/1969 | Priese |
| 3,746,303 | A | * | 7/1973 | Grove et al. .................. 251/159 |
| 3,765,647 | A | * | 10/1973 | Grove et al. .................. 251/317 |
| 3,912,220 | A | * | 10/1975 | Vasicek et al. ................ 251/159 |
| 4,047,275 | A | * | 9/1977 | Bake et al. ................. 29/890.127 |
| 4,163,544 | A | | 8/1979 | Fowler et al. |
| 4,254,793 | A | * | 3/1981 | Scaramucci ............. 137/246.22 |
| 4,477,055 | A | * | 10/1984 | Partridge ........................ 251/174 |
| 5,163,655 | A | | 11/1992 | Chickering, III et al. |
| 5,267,722 | A | * | 12/1993 | Coulter .................... 251/315.01 |
| 2005/0205826 | A1 | | 9/2005 | Scaramucci |

FOREIGN PATENT DOCUMENTS

GB    1414440 A    11/1975

OTHER PUBLICATIONS

Extended European Search Report issued by the European Patent Office for EP Application No. 11165203.8 on Oct. 21, 2013.

* cited by examiner

*Primary Examiner* — John K Fristoe, Jr.
*Assistant Examiner* — Daphne M Barry
(74) *Attorney, Agent, or Firm* — Baker & Hostetler LLP

(57) ABSTRACT

In an embodiment of the present invention, a valve seal for a ball valve includes a ball configured to mate with a tail piece, an annular seat ring to facilitate the mating of the ball with the tail piece, the seat ring having an angled wall having a first groove for accommodating a first seal and a second groove for accommodating a second seal, the first seal having a different Young's modulus from the second seal.

15 Claims, 8 Drawing Sheets

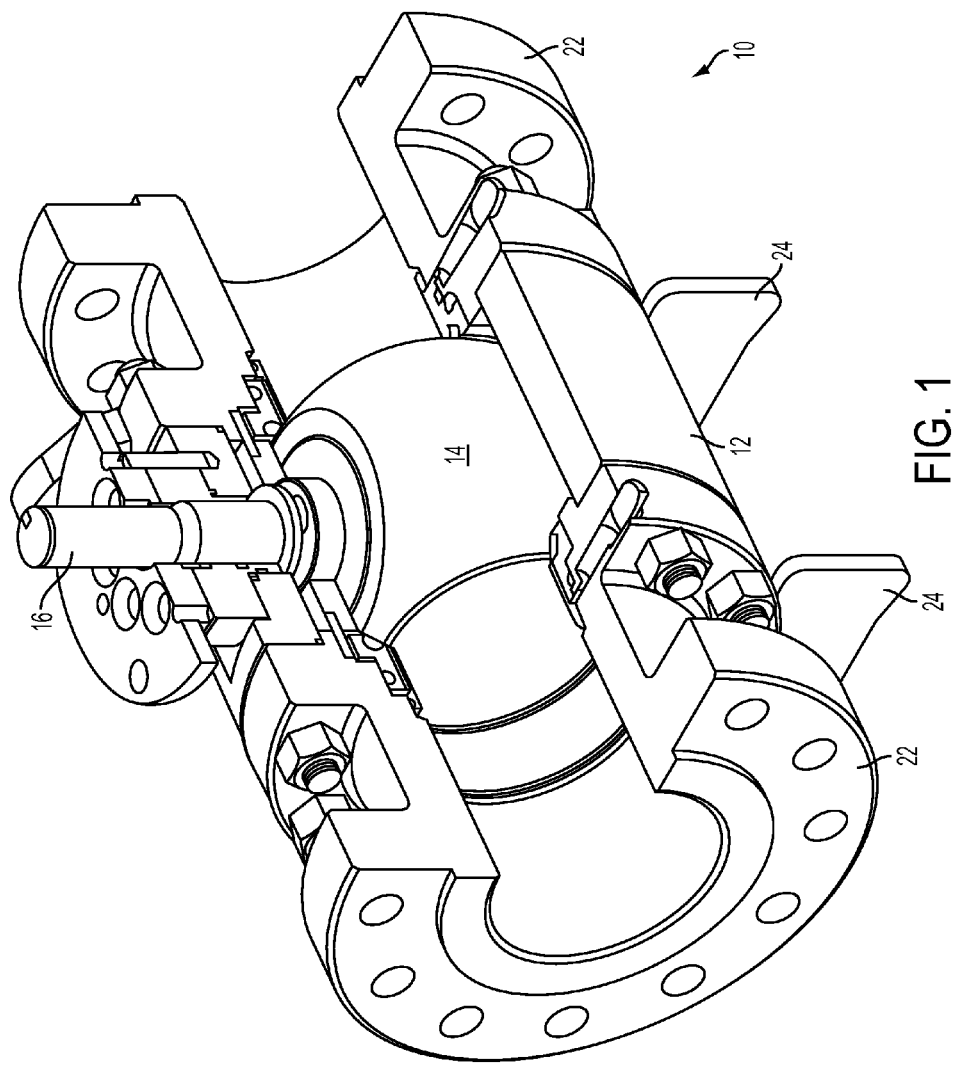

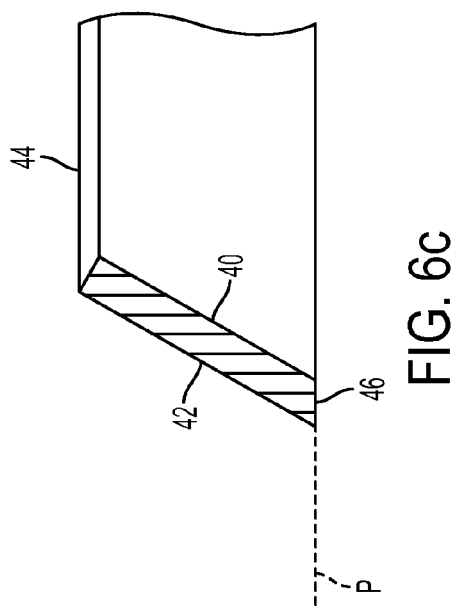
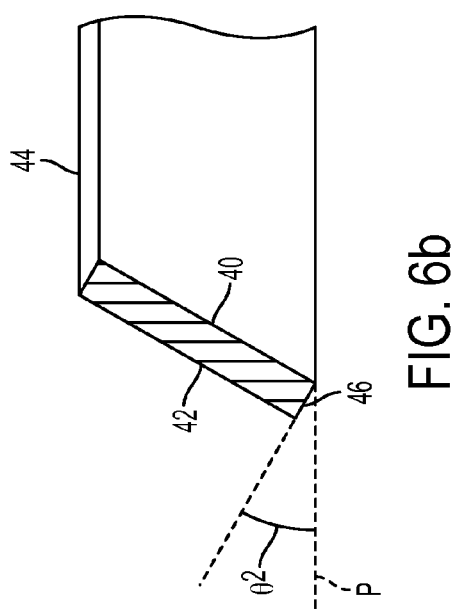

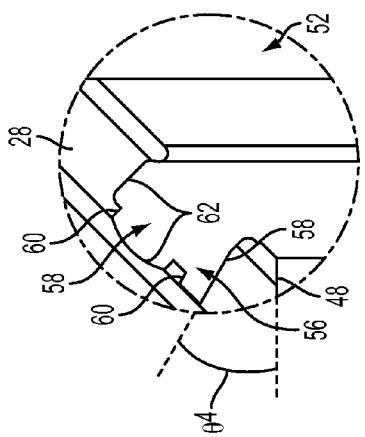
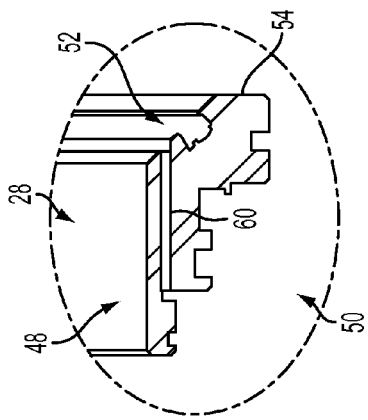
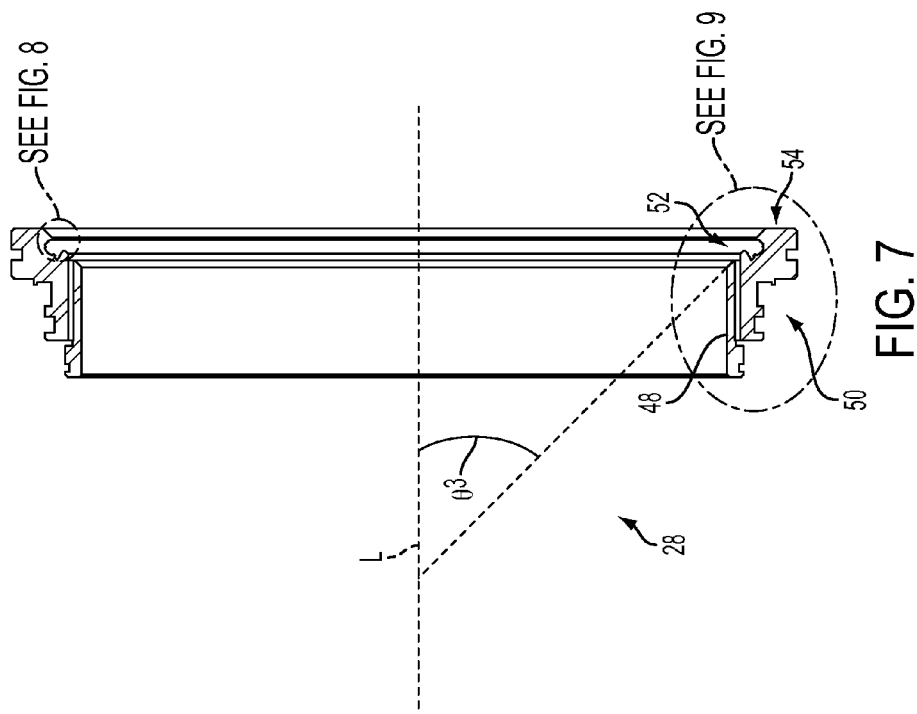

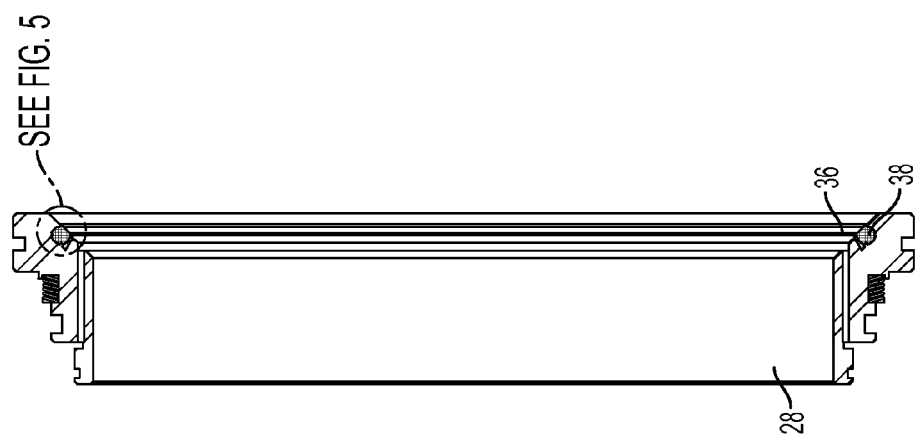

BALL VALVE SEAT SEAL

CROSS-REFERENCE TO RELATED APPLICATIONS

This application claims priority to U.S. provisional patent application Ser. No. 61/332,515, entitled, "Ball Valve Seat Seal System and Method," filed May 7, 2010, the disclosure of which is hereby incorporated by reference.

FIELD OF THE INVENTION

The present invention generally relates to a valve. More particularly, the present invention pertains to a ball valve.

BACKGROUND OF THE INVENTION

It is generally well known that valves are important devices for the regulation of fluid flow in pipes. In order to properly function, it is advantageous for the mating surfaces within the valve to engage with a relatively high degree of precision. Even with this relatively high degree of precision, valves typically include resilient seals such as, washers, O-rings or the like to ensure a fluid-tight seal when the valve is positioned in a closed configuration.

Unfortunately, it is difficult to provide a seal that functions across a range of pressures and temperatures, is compatible with a variety of fluids, allows the valve to be opened and closed with minimal effort, and is sufficiently wear resistant to withstand repeated opening and closing operations. While these issues are historically well known, conventional valves still suffer from one or more of these disadvantages.

In particular, conventional seals are annular and generally have a rectangular profile which can make them difficult to place in their respective grooves. Thus, their mating surfaces are not in full contact with the devices they are sealing. This lack of full contact leads to ineffective sealing, which is undesirable. Accordingly, it is desirable to provide a valve seal that overcomes the disadvantages described herein at least to some extent.

SUMMARY OF THE INVENTION

The foregoing needs are met, to a great extent, by the present invention, wherein in one respect valve seal is provided that in some embodiments overcomes the disadvantages described herein at least to some extent.

In an embodiment of the present invention, a valve seal for a ball valve includes a ball configured to mate with a tail piece, an annular seat ring to facilitate the mating of the ball with the tail piece, the seat ring having an angled wall having a first groove for accommodating a first seal and a second groove for accommodating a second seal, the first seal having a different Young's modulus from the second seal.

In another embodiment of the present invention, a valve seal for a ball valve includes a ball, an annular seat having a first groove and a second groove, configured to contact the ball, wherein the first groove has a first groove wall angled at an angle $\theta 1$ of less than 90° relative to a longitudinal axis disposed at a radial center of the seat, and a first seal comprising an annular band wherein a first interior wall of the band is disposed at an angle $\theta 2$ of less than 90° relative to a longitudinal axis disposed at a radial center of the band.

In still another embodiment of the present invention, a valve seal seat for a ball valve includes the seat comprising an annular geometry having a profile with an inner wall, an outer wall remote from the inner wall, a top wall and a bottom wall remote from the top wall, and a sloped wall defined between the inner wall and the top wall, the sloped wall having a first groove and a second groove, the first groove having a first groove wall angled at an angle $\theta 1$ of less than 90° relative to a longitudinal axis disposed at a radial center of the seat.

In still another embodiment of the present invention, a method of sealing a ball valve includes providing a ball configured to mate with a tail piece, providing an annular seat ring to facilitate the mating of the ball with the tail piece, the seat ring having an angled wall having a first groove for accommodating a first seal and a second groove for accommodating a second seal, the first seal having a different Young's modulus from the second seal, inserting the first seal in the first groove, forming the second seal in the second groove, and removing a portion of the first and second seals that protrude beyond the angled wall.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a partial cutaway perspective view of a ball valve system according to an embodiment of the invention.

FIGS. 6a-6c are cross sectional views of a frusto-conical elastomeric seal suitable for the ball valve system according to FIG. 1.

FIG. 7 is a cross sectional view of a seat ring suitable for the ball valve system according to FIG. 1.

FIG. 8 is a cross sectional view of ball valve seat seal grooves disposed in the seat ring.

FIG. 9 is a cross sectional view of an edge profile of the seat ring.

FIG. 10 is a cross sectional view of the seat ring having a ball valve seat seal suitable for the ball valve system according to FIG. 1.

DETAILED DESCRIPTION

The present invention provides, in some embodiments, a ball valve device, a unitary seat ring, and a frusto-conically shaped seal ring. The ball valve is configured to provide control over the flow of fluids, such as liquids and gases, across a relatively wide range of pressures. In particular, the valve is configured to provide a fluid-tight seal when positioned in the closed position in high and low pressure applications. The ability to form a fluid-tight seal across a variety of pressures is facilitated by various embodiments of the present invention.

Figure 3:
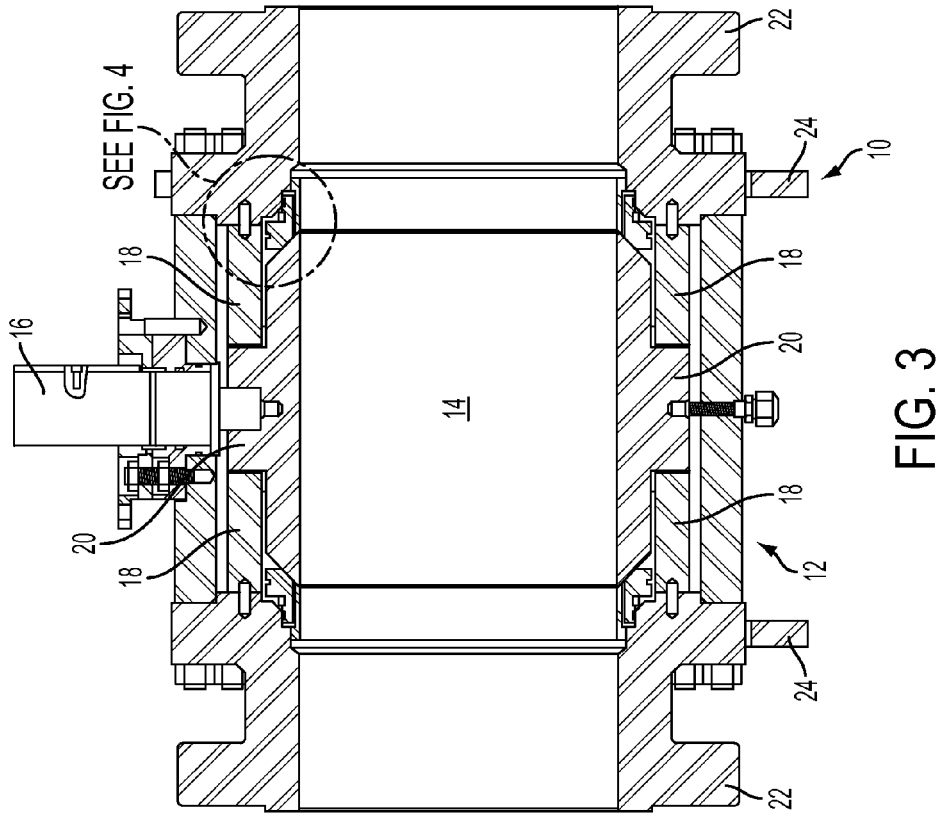
FIG. 3 is a cross sectional view of the ball valve system according to FIG. 1.
Figure 2:
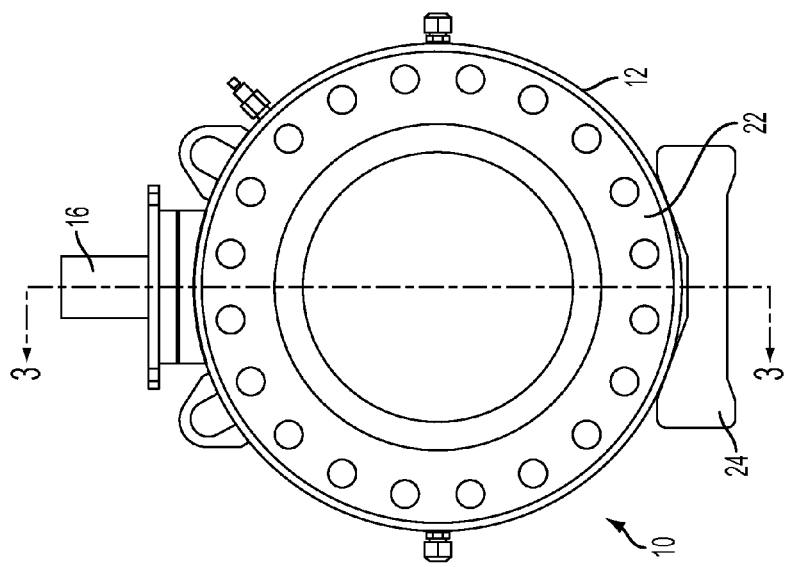
FIG. 2 is a front view of the ball valve system according to FIG. 1.

The invention will now be described with reference to the drawing figures, in which like reference numerals refer to like parts throughout. FIG. 1 is a partial cutaway perspective view of a ball valve device according to an embodiment of the invention. FIG. 2 is a front view of the ball valve device according to FIG. 1. FIG. 3 is a cross sectional view of the ball valve device according to FIG. 1. As shown in FIGS. 1-3, a ball valve system 10 includes a valve body 12 to house a ball 14. The valve body 12 may include one or more flanges, threads, sweat fittings, or the like to secure the ball valve 10 to pipes and/or fluid containers. The ball 14 has generally a spherical geometry having a through-hole (not shown) disposed therethrough. A shaft or stem 16 is secured to the ball 14 at the through hole and extends out from the valve body 12. The stem 16 is used to rotate the ball 14 within the valve body 12. The ball valve 10 is opened by rotating the through-hole in alignment with the valve body 12 and is closed by rotating the through-hole perpendicular to the valve body 12.

A trunnion block 18 supports the ball 14 and centers it in the valve body 12. The trunnions 20 and trunnion blocks 18 take the load exerted on the ball 14 by line pressure. A tail piece 22 provides the end connection that is used to attach the valve body system 10 to a pipeline or the like (not shown). The tail piece 22 also closes off the valve body 12 and locks the trunnion blocks 18 in place. Bearing blocks 24 are used to support the valve body 10.

Figure 4:
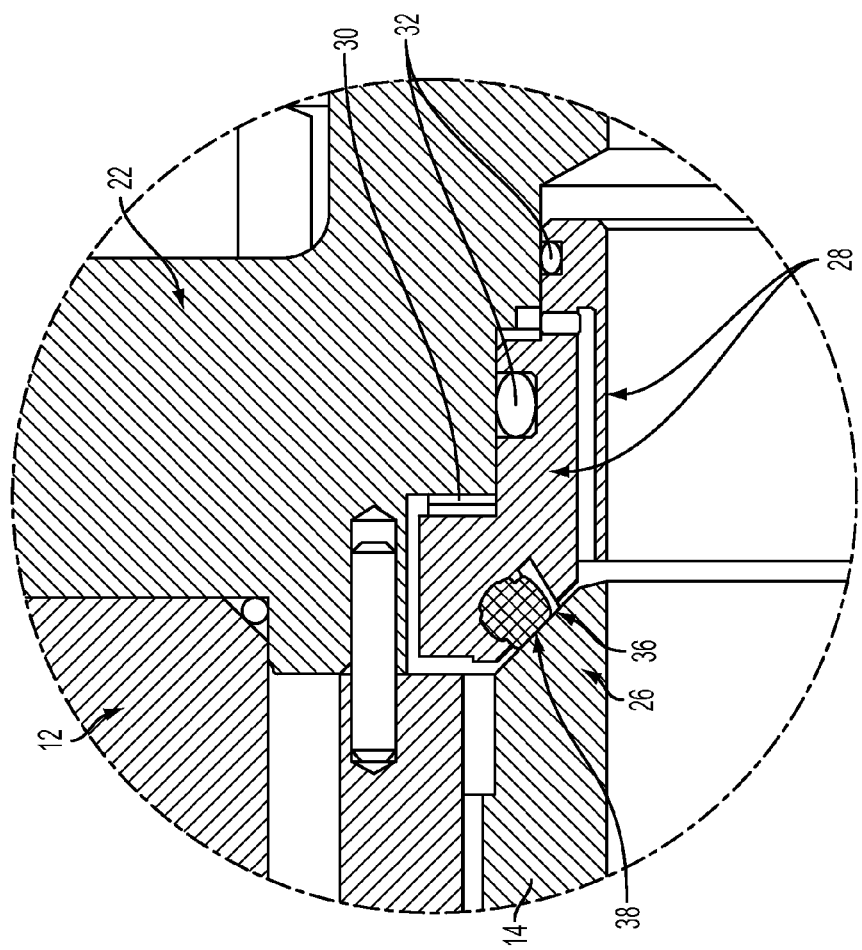
FIG. 4 is a cross sectional view of a portion of the ball valve system according to FIG. 1.

FIG. 4 is a cross sectional view of a portion of the ball valve device according to FIG. 1. Although a portion of the system is shown, it is noted that the system is circular and attention is drawn only to a profile of one end of the valve body 12. As shown in FIG. 4, the ball valve system 10 includes a ball valve seat seal 26 disposed between the valve body 12 and the ball 14. In the example shown, the ball valve seat seal 26 is disposed in a seat ring 28. The seat ring 28 is urged towards the ball 14 via at least one spring. Generally, the valve is spring energized with wave springs or coil springs, as desired. Pressure may also energize the seat and push it against the ball, aiding the spring force in low pressure applications. In this manner, sealing contact is maintained. The seat ring 28 is slidably sealed within the valve body 12 via one or more O-rings 32. In a particular example, the seat ring 28 is configured with a pair of O-rings 32.

Figure 5:
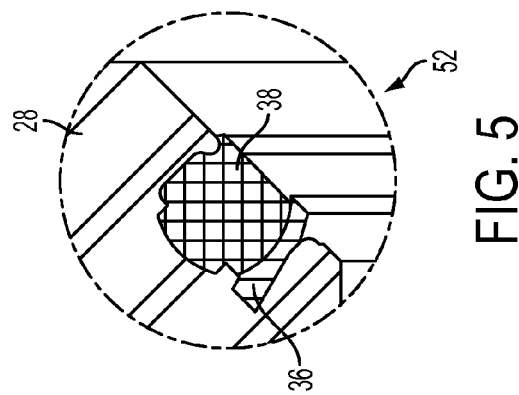
FIG. 5 is a cross sectional view of a ball valve seat seal installed in a ball valve seat seal groove according to an embodiment of the present invention.
Figure 6A:
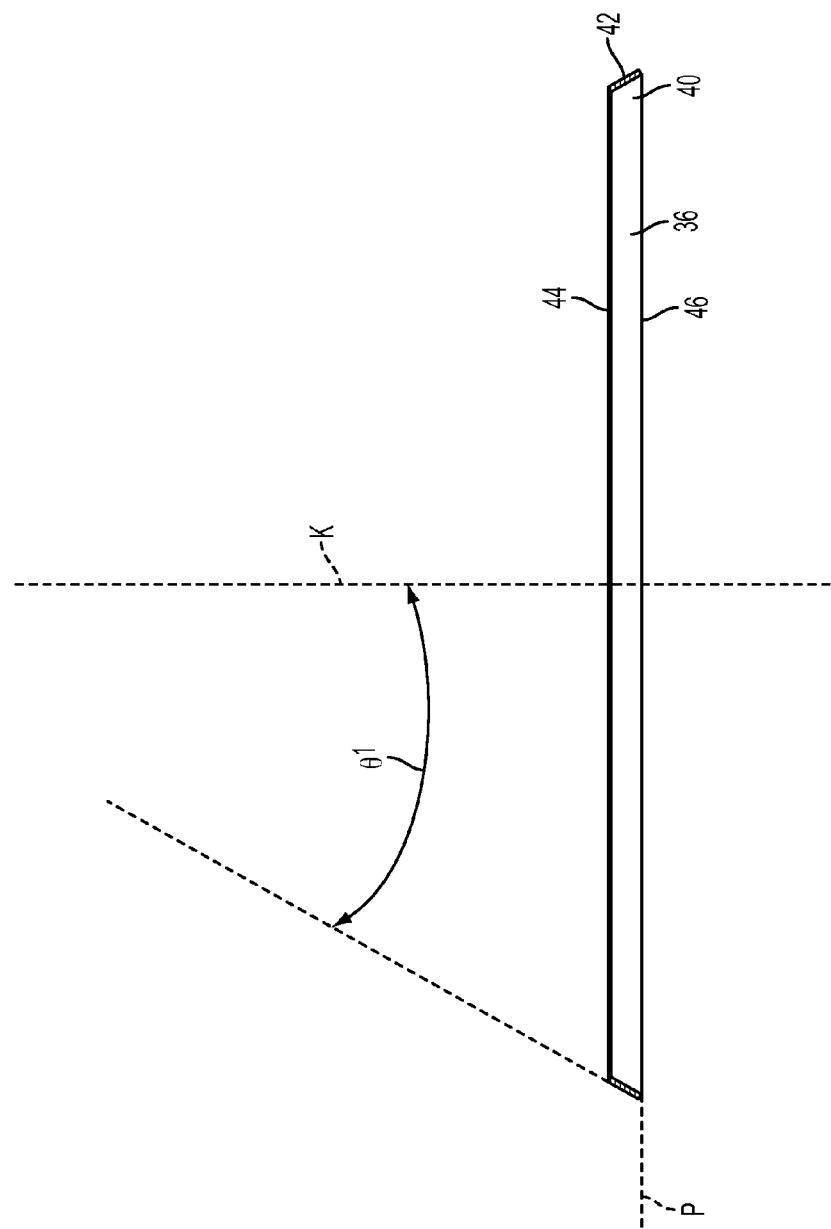

As further shown in FIGS. 4-5, the ball valve seat seal 26 includes two components, a first seal 36 and a second seal 38. The first seal 36 is an annulus and has a parallelogram geometry when viewed in profile. As shown in FIGS. 6a-6c, the first seal 36 is fabricated as a frusto-conical annular band and has a longitudinal axis "K" at the radial center of the annulus. The first seal 36 has an inner wall 40, an outer wall 42, generally parallel to the inner wall 40, and a top wall 44 and a bottom wall 46, generally parallel to the top wall 44, when viewing the first seal 36 in profile. In this manner, the inner and outer walls 40, 42 are disposed at an angle θ1 relative to the longitudinal axis K, as shown in FIG. 6a. This angle θ1 is between about 40° and 50°, generally about 45°. The terms "top" and "bottom" are mentioned only in relation to the figures as a reference point and are not to be interpreted in any way limited to direction or orientation.

In an embodiment of the present invention, as shown in FIG. 6b, top and bottom walls 44 and 46 are generally disposed at an angle θ2 relative to a plane "P" perpendicular to the longitudinal axis K. This angle θ2 is generally less than 90°. In an alternate embodiment of the present invention the top and bottom walls 44, 46 are flat such that they lie parallel to the plane P and the angle θ2 is zero.

The first seal 36 acts as a low pressure seal as well as a wiper to help protect the ball 14 from foreign particles. In an embodiment of the present invention, the first seal 36 is formed of an elastomeric material. The term, "elastomeric" is used to define any suitable material with properties similar to natural rubber or other such elastic polymers. In general, suitable elastomers may include thermoset, thermoplastics, or otherwise formed materials having a Young's modulus of about 0.01 GPa to about 1 GPa.

FIG. 7 is a cross sectional view of the seat ring 28 suitable for the ball valve device 10 according to FIG. 1. As shown in FIG. 7, the seat ring 28 is a unitary annulus that greatly facilitates ease of assembly and maintenance and improves durability as compared to multi-component seat rings used in conventional valve systems With reference now to FIGS. 7-9, the seat ring 28 has a longitudinal axis "L" as shown at the radial center of the annulus. The seat ring 28 includes an interior portion 48 generally parallel to the longitudinal axis L and an exterior portion 50 remote therefrom, also generally parallel to the longitudinal axis L. The seat ring 28 further includes a sloped portion 52 disposed at an angle θ3 relative to the longitudinal axis L. The seat ring 28 also includes an upper portion 54 generally perpendicular to the longitudinal axis L. The term "upper" is mentioned only in relation to FIGS. 7-9 as a reference point and is not to be interpreted in any way limited to direction or orientation.

The sloped portion 52, as shown in greater detail at FIG. 8 has several grooves formed therein. A first groove 56 is formed to receive the first seal 36 of FIG. 6. The first groove 56 has a first groove wall 58. The first groove wall 58 is formed at an angle θ4 relative to the interior portion 48 of the seat ring 28, or in turn the longitudinal axis L. Angle θ4 is similar to θ1, and in one embodiment of the present invention, is identical to θ1. The similarities of angle θ1 to θ4 allow for the seat ring 28 to easily accommodate the first seal 36 and remain in place during assembly.

A second groove 58 is disposed in the seat ring 28 to accommodate the second seal 38. The second groove 58 has a number of groove indentations 60 and groove walls 62. The indentations 60 and walls 62 allow for the second groove 58 to firmly grip and adhere to the second seal 38. In one embodiment, one or both of the walls 62 has an arcuate geometry. The second seal 38 has a generally circular geometry with various indentations and grooves when viewed in profile, as shown in FIGS. 4-5. In an embodiment of the present invention, the second seal 38 is a polymer that is inserted into the second groove 58 and takes the shape of the second groove 58. The term, "polymer" is used to define any suitable material with properties having a Young's modulus of about 1.5 GPa to about 5 GPa. In an embodiment of the present invention, polymers can include suitable polymers such as thermoplastics, resins and polyamides, such as but not limited to, Nylon.

Generally, the polymer material is placed in a groove formed on the seat ring 28 for the polymer material to form the second seal 38. The polymer material then takes the shape of the groove and fills in the indentations of the groove. The second seal 38 functions as a high pressure seal and provides a resilient load bearing surface to prevent metal to metal contact between the ball valve seat seal 26 and the ball 14. The first seal 36 is inserted into the first groove 56 and stays in place without the need to be held in place by an operator, allowing for easy insertion of the second seal 38.

Referring now to FIG. 9, The seat ring 28 has an exterior portion 50 having numerous grooves and indentations formed thereon for accommodating at least one O-ring and at least one spring. A through hole 60 is formed on the seat ring 28 between the interior portion 48 and the exterior portion 50 and is viewed as a gap in the figures in cross section. The through hole 60 allows grease to flow through from the body and through the seat to exit close to the seal area around the ball.

FIG. 10 depicts the sloped portion 52 of the seat ring 28 with the first and second seals 36, 38 installed in the seat ring 28. One or more springs may be installed in the seat ring prior to assembly of the ball valve. It is an advantage of this embodiment that the preassembled springs, such as for example, coiled springs, are pre-tensioned and retained in preparation for assembly.

Figure 11B:
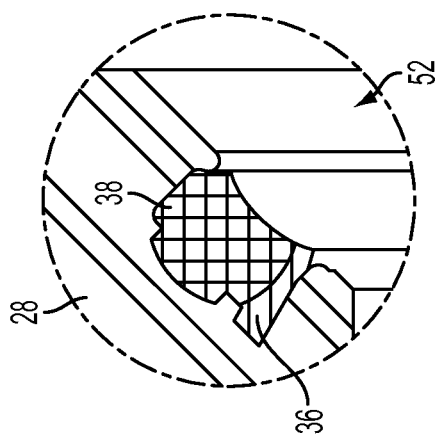
FIGS. 11a-11b are cross sectional views of a ball valve seat seal installed in the ball valve seat seal groove.
Figure 11A:
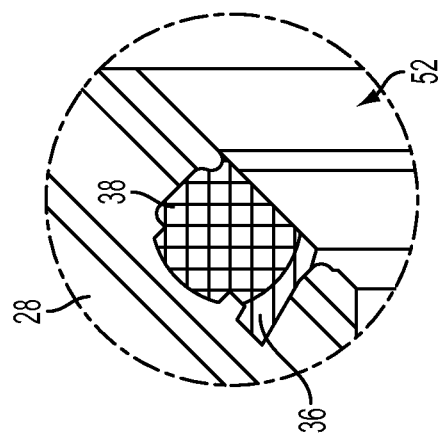

As best seen in FIG. 5, after the first and second seals 36, 38 are installed in the first and second seat ring grooves 56, 58, portions of the first and second seals 36, 38 protrude out of the first and second seat ring grooves 56, 58, such that they are not flush with the sloped portion 52 of the seat ring 28. As seen in FIG. 11a, in an embodiment of the present invention, the first and second seals 36, 38 can be machined flat so that they are flush with the sloped portion 52. In an alternate embodiment, the first and second seals 36, 38 can be machined to have an arcuate shape that matches the radius of the ball 14. In this manner, greater contact can be maintained between the seals and the ball 14. The additional step of machining after insertion of the seals ensures that tighter tolerances are kept with respect to the contact of the seals with the ball for better overall seal. In this manner, friction that may retard rotation of the ball may be reduced and thus, operation of the ball valve may be facilitated.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A valve seal for a ball valve, comprising:
a ball configured to mate with a tail piece;
an annular single piece seat ring having an interior portion and an exterior portion to facilitate the mating of the ball with the tail piece,
a single seal component group comprising a first seal and a second seal, the first seal being an annular band and being frusto-conical in geometry and the first seal having a cross-sectional shape that is a parallelogram, the seat ring having an angled wall having a first groove for accommodating the first seal and a second groove for accommodating the second seal, the first seal having a different Young's modulus from the second seal, wherein said first seal and said second seal are each retained in said respective first and second grooves by press fit;
the second groove having a plurality of indentations configured to grip the second seal and the second seal being initially circular in cross-section and configured to conform to and be gripped by the plurality of indentations; and
a hole formed on said seat ring wherein said hole allows for the flow of lubricant there through around said ball.

2. The valve seal of claim 1, wherein the first seal is formed of an elastomeric material.

3. The valve seal of claim 1, wherein the first seal has a Young's modulus of about 0.01 GPa to about 1 GPa.

4. The valve seal of claim 1, wherein the second seal is formed of a polymer material.

5. The valve seal of claim 1, wherein the second seal is formed of Nylon.

6. The valve seal of claim 1, wherein the second seal has a Young's modulus of about 1.5 GPa to about 5 GPa.

7. A valve seal for a ball valve, comprising:
a ball;
an annular single piece seat ring having an interior portion and an exterior portion and a first groove and a second groove, configured to contact the ball, wherein the first groove has a first groove wall angled at an angle θ1 of less than 90° relative to a longitudinal axis disposed at a radial center of the seat;
a single seal component group comprising a first seal that is conical in geometry and a second seal, wherein said first seal and said second seal are each retained in said respective first and second grooves by press fit;
the first seal comprising a frusto-conical annular band having a cross-sectional shape that is a parallelogram, wherein a first interior wall of the band is disposed at an angle θ2 of less than 90° relative to a longitudinal axis disposed at a radial center of the band;
the second groove having a plurality of indentations configured to grip the second seal and the second seal being initially circular in cross-section and configured to conform to and be gripped by the plurality of indentations; and
a hole formed on said seat ring wherein said hole allows for the flow of lubricant there through around said ball.

8. The valve seal of claim 7, wherein angle θ1 and angle θ2 have a ratio of about 0.5:1 to about 1:1.

9. The valve seal of claim 7, wherein angle θ1 and angle θ2 have a ratio of about 1:1.

10. The valve seal of claim 7, wherein the band is formed of an elastomeric material.

11. The valve seal of claim 7, wherein the band has a Young's modulus of about 0.01 GPa to about 1 GPa.

12. The valve seal of claim 7, wherein the second groove is configured to receive a second seal.

13. The valve seal of claim 7, wherein the second seal is formed of a polymer material.

14. The valve seal of claim 7, wherein the second seal is formed of Nylon.

15. The valve seal of claim 7, wherein the second seal has a Young's modulus of about 1.5 GPa to about 5 GPa.

* * * * *